March 4, 1958     G. A. CURTIS     2,825,776
OVERLOAD CUTOUT SWITCH

Filed May 6, 1955     2 Sheets-Sheet 1

INVENTOR.
Guy A. Curtis,
BY Gehr & Leonard,
his ATTORNEYS.

March 4, 1958  G. A. CURTIS  2,825,776
OVERLOAD CUTOUT SWITCH
Filed May 6, 1955  2 Sheets-Sheet 2

INVENTOR.
Guy A. Curtis,
BY Gehr & Leonard,
his ATTORNEYS.

2,825,776

OVERLOAD CUTOUT SWITCH

Guy A. Curtis, Cleveland Heights, Ohio

Application May 6, 1955, Serial No. 506,413

8 Claims. (Cl. 200—61.46)

This invention relates to overload cutout switches and particularly to an overload cutout switch which is adapted to turn on or turn off the power supplied to a mechanism consequent upon resistance to a transmitted torque becoming excessive, so as to protect the associated equipment from excessive torque caused by a prime mover or by overhauling loads.

More particularly the present invention resides in a cutout device for controlling the power supplied to a motor or rotatable prime mover coupled to a driven shaft upon the resistance to rotation of the shaft being increased beyond a predetermined amount.

A more specific object is to provide a slip clutch and cutout combination which upon slippage of the clutch causes discontinuance of the power supply to a prime mover.

Another object is to provide a combined slip clutch and cutout switch in which the switch is operated by the clutch consequent upon slipping of the clutch.

Various additional objects and advantages will become apparent from the following description wherein reference is made to the drawings, in which.

For the purpose of illustration, the invention will be described as drivingly connecting an electric motor to a driven shaft and operative to disconnect the motor from its power source in event the resistance to rotation of the driven shaft becomes excessive for any reason, thereby protecting the motor and clutch itself from overload and excessive heat and wear.

In many installations of power driven equipment it is desirable to couple a rotatable driving member to a driven member by means of a slip clutch. However, considerable difficulty has been encountered in providing a simple and inexpensive switch which operates to discontinue the admission of power to the motor in event the driven member resists the torque delivered by the prime mover so greatly as to cause the clutch to slip.

Figure 1:
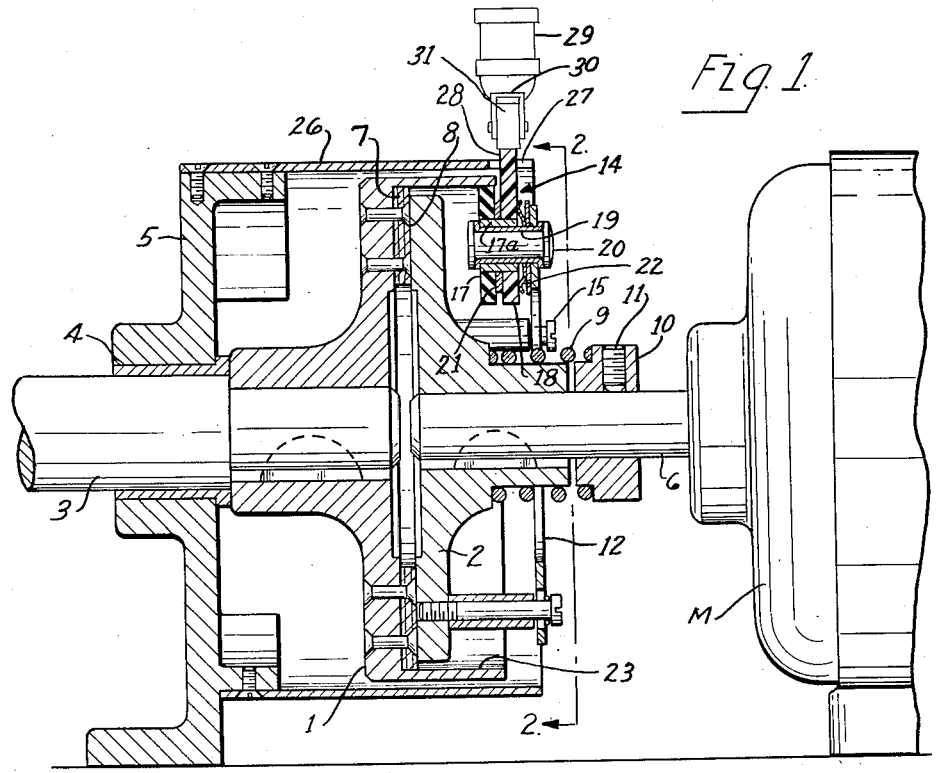
Fig. 1 is a vertical longitudinal sectional view of a device embodying the principles of the present invention, taken on line 1—1 of Fig. 2.
Figure 2:
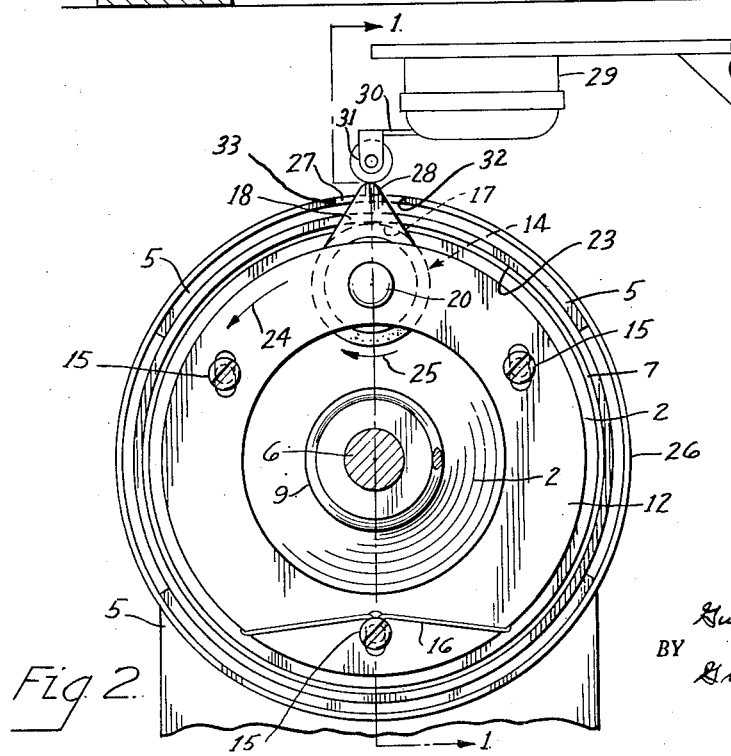
Fig. 2 is a fragmentary cross sectional view of the device, taken on the line 2—2 of Fig. 1.

In Figs. 1 and 2 a preferred embodiment of the invention is shown as comprising a pair of co-rotating friction slip clutch members 1 and 2. The clutch member 1 is fixedly secured to a driven shaft 3 mounted in a suitable bearing 4 in a housing 5. The member 2 is mounted on the shaft 6 with a suitable electric motor M for rotation with the shaft 6 and movement axially thereof into clutching position. The members 1 and 2 are coaxial and the member 1 is provided on its clutching face with a suitable wear resisting lining 7 which is engageable by the face 8 of the member 2. A clutch spring 9 is interposed between a suitable collar 10, locked on the shaft 6, and the member 2, and yieldably maintains the members 1 and 2 in firm clutching engagement so as to transmit a predetermined torque. The torque transmitted can be varied by changing the compression on the spring 9 by moving the collar 10 and locking it in selected adjusted positions along the shaft 6 by means of the set screw 11.

Mounted on the member 2 for movement relative thereto transversely of the axis of rotation of the member 2 is a plate or support 12 on which is rotatably mounted a switch actuating device which is indicated generally at 14. The plate 12 is secured to the member 2 by means of bolts 15 for sliding movement preferably parallel to the plane of the contact faces of the clutch members. A suitable spring 16 yieldably urges the plate 12 unidirectionally transversely of the relative axis of the member 2.

The actuating device 14 comprises a roller 17 and a cam 18 arranged to rotate about a common axis. The roller 17 is rotatably mounted on a suitable sleeve 19 which is fixedly secured by a bolt 20 to the plate 12. The roller has a hub portion 17a rigid therewith and on which the cam 18 is mounted for rotation relative thereto and movement axially thereof. The roller 17 and cam 18 preferably are made of rubber and nylon, respectively.

Interposed between the cam 18 and the roller 17 is a washer 21 which preferably is of brass. Operatively interposed between the plate 12 and the cam is a spring washer 22 which yieldably urges the cam into frictional contact with the washer 21 and the washer 21, in turn, into frictional contact with the roller 17, thus frictionally connecting the roller and cam for rotation together about the axis of the bolt 20.

Rigid with the member 1 is an annular trackway 23 which, in the particular form illustrated in Fig. 1, is in the form of an annular flange coaxial with the shaft 3 and member 1 and extending endwise of the clutch. The trackway 23 is positioned relative to the roller 17 so that upon relative rotation of the members 1 and 2 the roller will be held in rolling engagement with the trackway 23 by the plate 12 and spring 16. Since the members 1 and 2 normally rotate together as a unit there is no relative rotation between the members 1 and 2 and consequently none between the roller 17 and the trackway 23. However, upon slippage of the clutch there is relative rotation between the member 2 and trackway 23. Accordingly, due to the frictional engagement of the roller 17 with the trackway 23 under the influence of the spring 16, the roller is forced to rotate about the axis of the bolt 20. The roller 17, in turn, rotates the cam 18 in the same direction due to the frictional driving engagement of the cam with the roller.

Referring to Fig. 2 it is apparent that if the member 2 is rotated relative to the member 1 in a counterclockwise direction, as indicated by the arrow 24, the roller 17 will be caused to rotate about the axis of the bolt 20 in the opposite, or clockwise, direction, as indicated by the arrow 25.

Mounted on the support 5 is a shield 26 which is in a position to be engaged by the cam 18 so as normally to prevent rotation of the cam by the roller 17 beyond a predetermined rotated position. In the form illustrated, the shield is shown as coaxial with the members 1 and 2 and positioned axially thereof so as to surround the path of the cam as it is rotated about the axis of the member 2 or shaft 6. The shield thus prevents rotation of the cam by the roller while leaving it frictionally urged to rotate by the roller.

At a selected location about the periphery of the shield 26 the confining surface of the shield is interrupted, as indicated at 27. This interruption is such as to leave the cam unconstrained from rotation about the axis of the bolt 20 along a portion of the path of travel of the cam about the axis of the shaft 6. Accordingly, when the cam 18 reaches the interruption 27 it can be, and is, rotated by the roller 17 so that the peak 28 of the cam passes through the interruption and protrudes outwardly beyond the shield 26.

At this location along the path of rotation about the axis of the shaft 6, there is arranged an electric switch 29 having an operating lever 30 with a roller 31 on the end thereof. The switch 29 is positioned so that the roller 31 is engaged by the cam peak 28 and operated thereby to operate the switch.

As mentioned heretofore the cam rotates about the axis of the bolt 20 in a direction opposite from the rotation of the member 2 relative to the member 1 about the axis of the shaft 6. Therefore, the peak of the cam does not strike those shield edges, indicated at 32 and 33, defining the interruption or opening through which the peak passes. Instead, as the cam is carried about the axis of the shaft 6 in the counterclockwise direction, the peak leads the remainder of the cam in the direction of rotation about the axis of the shaft 6. Therefore, as soon as the peak 28 reaches the interruption 27, it swings outwardly thereinto as it passes from beneath the edge 32. As the member 2 continues its rotation about the axis of the shaft 6, which rotation ordinarily would tend to carry the cam counterclockwise and cause its peak to strike the edge 33, the cam has been rotated about the axis of the bolt 20 at a greater rate of speed so that the peak is receding from the interruption 27. The rate of clockwise rotation of the cam about the axis of the bolt 20 is so much greater than the counterclockwise rotation of the cam about the axis of the shaft 6 that the peak strikes the switch roller 31 and trips the switch and then recedes back through the interruption 27 inwardly from the shield before the protruding portion or peak of the cam can reach and strike the edge 33. Thus neither the cam nor the other parts of the equipment are subjected to damaging impact.

Figure 3:
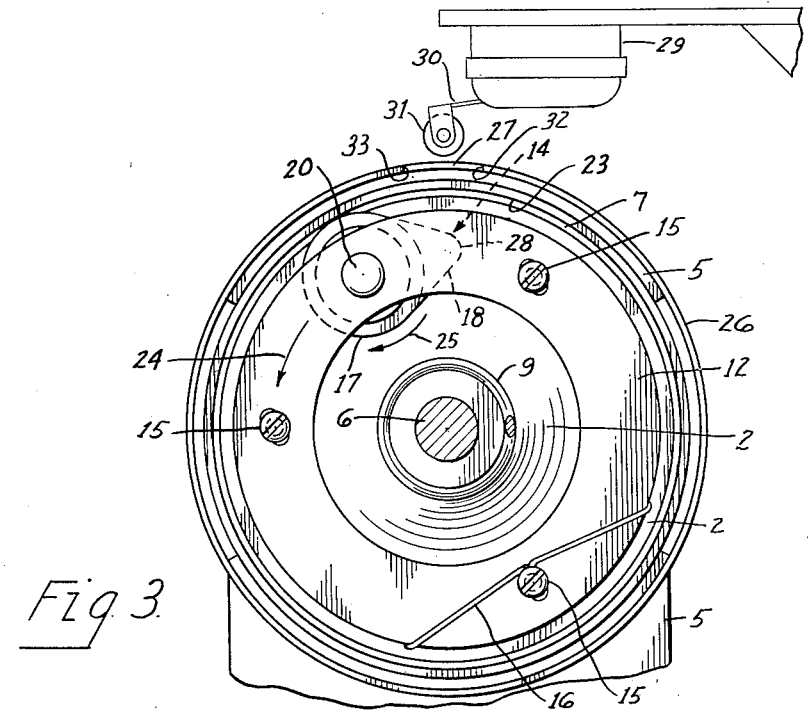
Figs. 3 and 4 are diagrammatic views similar to Fig. 2 but showing different operating positions of certain parts of the device.
Figure 4:
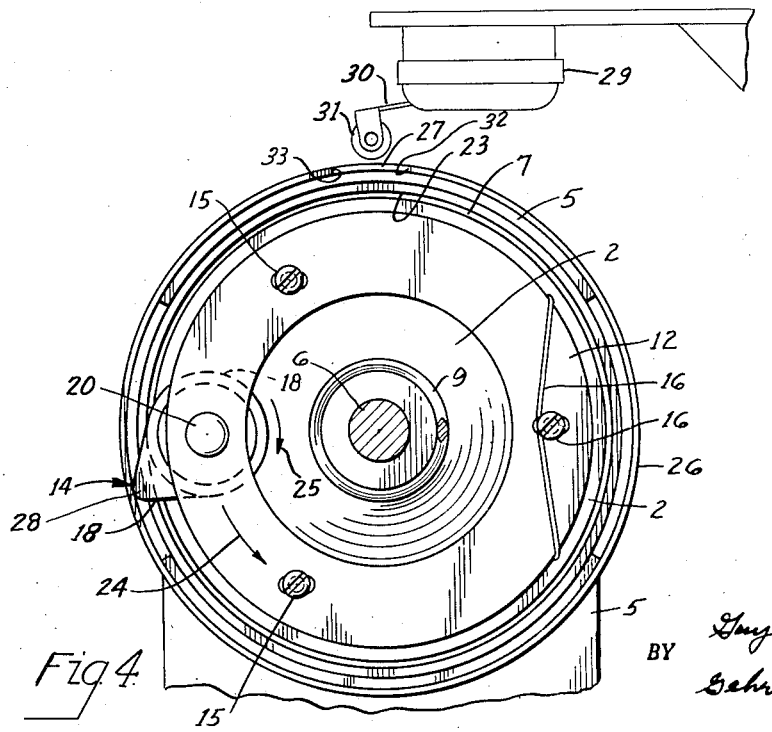

Starting from the position shown in Fig. 2 and assuming the cam 18 has just operated the switch 29, it is apparent from Fig. 3 that, upon slightly farther rotation of the member 2 relative to the member 1 in a counterclockwise direction, the peak 28 of the cam 18 has moved inwardly sufficiently to be clear of the edge 33 and also the inner surface of the shield 26. As the member 2 continues its counterclockwise rotation relative to the member 1, the cam 18 is rotated farther in the clockwise direction at a rate such that, before the cam again reaches the interruption 27, the peak 28 of the cam engages the inner surface of the shield. This constrains the cam from rotation by the frictional drive of the roller 17 until the cam again reaches the interruption 27, whereupon the operation is repeated.

In the form illustrated, only one switch 29 is provided and therefore only one interruption 27 in the shield is provided.

The diameter of the roller 17 relative to the diameter of the trackway 23 is such that the peak 28 of the cam 18, after retracting into the shield 26 from the interruption 27, does not engage the shield until the member 2 has made substantially a half revolution relative to the member 1, thus reducing the wear on the cam peak by the trackway 23.

At most, only one revolution of the member 2 relative to the member 1 is necessary in order to actuate the switch for deenergizing the motor. By making the roller 17 larger in diameter the rate of rotation of the cam can be decreased. By making the roller 17 smaller, the rate of rotation of the cam can be increased. By variations in this relation the cam can be arranged to swing outwardly through more than one selected interruption or opening, such as the interruption 27, at preselected positions about the periphery of the shield 26.

The switch preferably is one which can be arranged to energize or deenergize the motor when operated by the cam 18. If the motor M is a prime mover, safety normally would require that the operation of the switch deenergize it should too heavy a load be applied on the shaft 3. On the other hand if the great danger were in overhauling loads on the shaft 3, then the member 2 should be connected to the shaft 3 and the member 1 to the motor shaft and the switch arranged so as to energize and thereby apply a brake or the like and thus reduce the speed of the shaft 3 in event of overhauling loads.

Further it is apparent from the foregoing description that the device is operable in either direction of rotation of the member 2 relative to the member 1 and is adaptable for the control of various combinations of co-rotatable driving and driven members which are connected by a slip clutch.

Having thus described my invention, I claim:

1. An overload cutout switch comprising a rotatable driving member, a coaxial rotatable driven member, coupling means normally drivingly coupling said members for rotation together about their common axis for transmitting a torque and being operable to partially release the members for relative rotation when the transmitted torque exceeds a predetermined amount, a driven element mounted on one of the members and in driving engagement with the other member for predetermined movement by the other member upon relative rotation of the members, a switch tripping element operatively connected to the driven element and movable thereby to a switch operating position upon said predetermined movement of the driven element, and a switch arranged to be operated by the tripping element when the tripping element is in said switch operating position.

2. An overload cutout switch according to claim 1 characterized in that the driven element is rotatable and is in frictional engagement with, and is frictionally driven by, said other member.

3. An overload cutout switch according to claim 1 characterized in that the driven element is a roller and is rotatably mounted on said one member so that its rim is in frictional rolling contact with the other member at a location spaced from the common axis of said members, and the tripping element is rotatably driven by the roller.

4. An overload cutout switch according to claim 3 characterized in that the tripping element is frictionally driven by the roller.

5. An overload cutout switch comprising a rotatable driving member, a coaxial rotatable driven member, coupling means normally drivingly coupling said members for rotation together about their common axis for transmitting a torque and being operable to partially release the members for relative rotation when the transmitted torque exceeds a predetermined amount, a driven element mounted on one of the members and coupled to the other member for predetermined movement by the other member upon relative rotation of the members, a switch tripping element rotatable with said one member and operatively connected to the driven element and movable thereby in directions outwardly from, and inwardly toward, the axis of rotation of the members, constraining means having a confining surface which is disposed alongside the path of rotation, about said common axis, of the tripping element so that the surface normally prevents movement of the tripping element in one of its said outward and inward directions of movement, said surface being interrupted at one portion so that the element is unconstrained from movement in said one of said directions, and a switch arranged to be engaged and operated by the element consequent upon the element being moved in said one of its directions while unconstrained by said constraining means.

6. An overload cutout switch comprising a rotatable driving member, a coaxial rotatable driven member, coupling means normally drivingly coupling said members for rotation together about their common axis for transmitting a torque and being operable to partially release the members for relative rotation when the transmitted torque exceeds a predetermined amount, a roller mounted on one of the members for rotation relative thereto and in frictional engagement with the other member for rotation thereby upon relative rotation of the members, a tripping element rotatable with said one member and in frictional driving relation to the roller and driven thereby so as to rotate relative to said one member about an axis offset from the common axis, in a direction opposite from the direction of rotation of said one member about the common axis, constraining means having a confining surface which is disposed alongside the path of rotation, about said common axis of the tripping element so that said surface normally prevents rotation of the tripping element relative to said one member, said surface being interrupted at one portion so that the tripping element can rotate about said offset axis, and a switch arranged to be engaged and operated by the element consequent upon the element being rotated while unconstrained by said constraining means.

7. An overload cutout switch comprising a rotatable driving member, a coaxial rotatable driven member, coupling means normally drivingly coupling said members for rotation together about their common axis for transmitting a torque and being operable to partially release the members for relative rotation when the transmitted torque exceeds a predetermined amount, said other member having an inwardly facing annular shoulder coaxial therewith, a roller mounted on said one member for rotation about an axis eccentric to the common axis, said roller being in frictional engagement with said shoulder for rotation thereby upon relative rotation of the members, a tripping element rotatable about said eccentric axis, means frictionally coupling the roller and element for rotation of the element by the roller, said element having a tripping portion extending outwardly beyond the members when the tripping element is rotated about the eccentric axis to an extended position, a constraining means disposed alongside part only of the path of rotation of the element about the common axis and spaced outwardly from said path and slidably engaging the tripping element and constraining it from rotation about said eccentric axis to extended position as the tripping element passes along said portion of said path, said element being rotatable to extended position when unconstrained by the constraining means, a switch arranged to be engaged and operated by said tripping element when the tripping element is spaced from said constraining portion of the path and the tripping portion is in extended position.

8. In combination, a slip clutch adapted to drivingly connect a prime mover with a device to be driven, said slip clutch including a stationary housing and a pair of frictionally engaged slip clutch parts rotatably mounted therein, switch operating means carried by the clutch and normally inoperative when the clutch parts are co-rotating at the same speed, said switch operating means being carried by one of the parts and being in driving engagement with the other of the parts so as to be driven by the other of the parts consequent upon rotation of the parts relative to each other due to slippage of the clutch, a switch operating device mounted in fixed position relative to the housing, an element on the switch operating means and normally inoperative with respect to the switch operating device when said parts are rotating in fixed position relative to each other, and rendered operative by co-action of the switch operating means and parts upon rotation of the parts concurrently, at different velocities from each other, to operate the switch operating device.

References Cited in the file of this patent

UNITED STATES PATENTS

| | | |
|---|---|---|
| 1,482,167 | Varley | Jan. 29, 1924 |
| 1,851,227 | Whittingham | Mar. 29, 1932 |
| 2,096,069 | Seiden | Oct. 19, 1937 |
| 2,186,765 | Metcalf | Jan. 9, 1940 |
| 2,640,899 | Dickey | June 2, 1953 |
| 2,731,630 | Karlson | Jan. 17, 1956 |
| 2,737,550 | Lucien | Mar. 6, 1956 |